Patented Nov. 25, 1941

2,264,137

UNITED STATES PATENT OFFICE 2,264,137

RESINOUS CONDENSATION PRODUCT AND PROCESS OF MAKING SAME

Karl Keller, Frankfort-on-the-Main-Fechenheim, Germany, assignor to I. G. Farbenindustrie Aktiengesellschaft, Frankfort-on-the-Main, Germany No Drawing. Application July 14, 1938, Serial No. 219,197. In Germany July 20, 1937

2 Claims. (Cl. 260—72)

My present invention relates to resinous condensation products and to a process of making same. They are obtained by acting with organic polycarboxylic acids or their anhydrides, with or without the addition of a diluent, on polyhydroxymethylene derivatives of cyclic amidines, which polyhydroxymethylene derivatives are as such condensable and polymerizable by the action of heat or catalysts.

The reaction conditions for the action of the polycarboxylic acids or their anhydrides on the aforesaid polyhydroxymethylene compounds are chosen in such a manner that either before or simultaneously with a further polymerisation a complete or partial reaction of the carboxylic acid groups of the polycarboxylic acids with the alkylol groups occurs, it being of advantage in many cases to add to the reaction mass retarding agents for the polymerisation such as small quantities of alkalies or organic bases. When the condensation reaction has occurred a higher degree of polymerisation may be obtained, for example, by heating at higher temperatures.

As suitable polyhydroxymethylene compounds there may be mentioned the various methylol melamines, methylol amino pyrimidines, methylol guanazoles and the like.

As polycarboxylic acid compounds are suitable for example: oxalic acid, phthalic acid, phthalic anhydride, terephthalic, malonic, maleic or adipic acid and succinic anhydride.

In order to further illustrate my invention the following examples are given, the parts being by weight and all temperatures in degrees centigrade.

Example 1

31.5 parts of melamine are dissolved in about 150 parts of a hot neutralized formaldehyde solution of 30% strength. To the solution when cold while stirring slowly a solution of 30 parts of oxalic acid in about 200 parts of water is added and the solution thus obtained is evaporated at about 80 to 90°. Then the reaction mass is heated for some time at temperatures above 100°. In this manner an entirely colorless, transparent and extremely hard condensation product is obtained which product when pulverized is distinguished by the property of decolorizing dyestuff solutions.

Example 2

25.2 parts of melamine are dissolved in about 50 parts of a hot formaldehyde solution of 40% strength with the addition of about 4 parts of pyridine. To the warm solution 29.5 parts of finely powdered phthalic acid anhydride are added, whereby a temporary solution occurs. Then while stirring the temperature of the reaction of the reaction mass is increased the mass becoming viscous and the water is distilled off. A temperature of about 160° is maintained for some time and about 77 parts of a light and very hard condensation product is obtained which is resistant to acids and alkalies.

Example 3

35 parts of phenylguanazole are mixed with 40 parts of water and about 7 parts of pyridine. The mixture is warmed at about 35° and while stirring 120 parts of a formaldehyde solution of 40% strength are added. After a short time a clear solution of the methylol compound of phenylguanazole has been formed, which is then poured while stirring at about 90 to 95° slowly on a mixture of 80 parts of butanol and 25 parts of toluene. When the water has been mostly removed by an azeotropic distillation the solvent which has passed over is added again. After a far reaching dehydration 14.8 parts of phthalic acid anhydride are added and heating is continued and at about 130° the reaction mass begins to foam. Then to the viscous mass an amount of butanol or another suitable diluent corresponding to the desired degree of dilution is added, then the mass is stirred for some time and the viscous solution is freed from some impurities by filtration. The clear viscous solution thus obtained may by further diluted with butanol or other alcohols or mixtures of an alcohol and benzene, toluene, acetone, etc. It is easily miscible with nitrocellulosic lakes.

When coating with such a solution a surface of glass or metal, a rapidly drying transparent, bright and water repelling coat is obtained which can be hardened in the heat and is distinguished by a good affinity and resistance to organic solvents.

I claim:

1. A process for the manufacture of resinous condensation products which consists in acting with about 1 mol of an organic polycarboxylic acid compound selected from the class consisting of polycarboxylic acids and their anhydrides on about ¾ to 2 mols of a condensable and polymerizable polyhydroxymethylene derivative of a cyclic amidine.

2. Resinous condensation products prepared by acting with about one mol of an organic polycarboxylic acid compound selected from the class consisting of polycarboxylic acids and their anhydrides on about ¾ to 2 mols of a condensable and polymerizable polyhydroxymethylene derivative of a cyclic amidine.

KARL KELLER.